W. WILMINGTON.
METHOD OF CASTING CAR WHEELS.
No. 10,850. Reissued July 12, 1887.
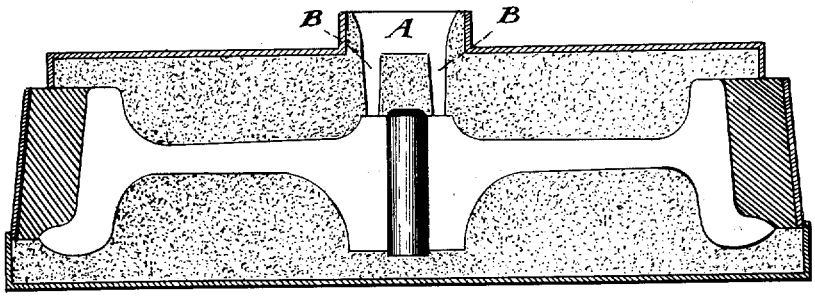
Witnesses:
A. Ruppert.
E. Cruse.
Inventor:
William Wilmington,
by Atty W. J. Hauck

UNITED STATES PATENT OFFICE.

WILLIAM WILMINGTON, OF TOLEDO, OHIO.

METHOD OF CASTING CAR-WHEELS.

SPECIFICATION forming part of Reissued Letters Patent No. 10,850, dated July 12, 1887.

Original No. 358,765, dated March 1, 1887. Application for reissue filed June 14, 1887. Serial No. 241,312.

*To all whom it may concern:*

Be it known that I, WILLIAM WILMINGTON, of Toledo, in the county of Lucas and State of Ohio, have invented a new and useful Improvement in Methods of Casting Car-Wheels, of which the following is a specification.

This invention is an improvement in the art of casting chilled-tread cast-iron car-wheels; and it consists in incorporating, in varying quantities during the casting of the wheel, rich ferro-silicon of commerce with chill-hardening cast-iron composing the different parts of the wheel.

Heretofore several Letters Patent of the United States have been granted to me upon methods for casting car-wheels, the distinctive features of which consist in incorporating rich and finely-powdered ferro-manganese of commerce, in varying quantities, with the different parts of a car-wheel by placing the ferro-manganese in the stream of molten iron passing from the pouring-ladle, or in the basin of the mold, for the purpose of restoring to the iron the manganese which had been more or less oxidized by previous meltings of the iron.

The material used in my present invention, known in commerce as "ferro-silicon," costs about one-half the price of eighty per cent. ferro-manganese, which latter substance I prefer to use in resuscitating a molten product derived from melting old or condemned car-wheels, which has lost by repeated melting a large portion of the manganese it formerly held in combination, and which largely composed the strength of the iron; but my present improvement is not intended to add manganese to cast-irons that already possess a quantity of this element sufficient to insure the durability of the tread of the wheel, but contemplates the combination, with an iron deficient in silicon, of a sufficient quantity of that substance to impart to the iron the degree of softness, strength, and elasticity necessary for certain parts of a car-wheel.

While hardness in the iron composing the tread of the car-wheel is absolutely necessary to secure durability to the wheel, it is injurious to the iron composing the hub and plate parts of the wheel. Therefore I limit the quality of hardness to the outer portions of the wheel. This I accomplish by incorporating with the molten iron forming the central parts of the wheel the quantities of ferro-silicon necessary to insure softness, strength, and a certain degree of elasticity. The effect of uniting ferro-silicon during the casting operation with the molten iron forming the central parts of the wheel is to cause the carbon in the said parts to assume a partially-graphitic state, which condition is opposed to chill-hardening. Consequently, when the proper quantities of ferro-silicon are united with the molten iron forming the hub and inner plate parts of the wheel, the graphitic condition of the carbon thus produced prevents hardness and rigidity in these parts—an advantage in casting car-wheels too well known to need comment.

In carrying out my invention I melt in a cupola, in the ordinary manner, the desired quantity and quality of cast-iron, and from a small portion drawn into a reservoir or ladle for the purpose I cast trial-pieces to determine what quantity of ferro-silicon will be required to produce the desired effects upon the iron destined to form the central portions of the wheel. This having been determined, the molten iron is drawn into the pouring-ladle for transfer to the mold, and the wheels are cast in the ordinary manner, with the following exceptions: When the mold is about one-half filled with the molten iron, I place, with a suitable instrument, gradually-increasing quantities of rich and finely-powdered ferro-silicon into the stream of molten iron passing from the pouring-ladle, or I place it directly into the basin of the mold, and continue this operation until the mold is filled. I may, in the use of some qualities of iron, place powdered ferro-silicon in another and smaller ladle containing molten cast-iron, and pour the mixture from the smaller ladle into the stream of molten iron passing from the main pouring-ladle, or pour it directly into the basin of the mold until the mold is filled. In either case I allow the ferro-silicon to be melted and disseminated throughout, and by the heat inherent in, the molten iron in the basin before the ferro-silicon enters the mold through the openings in the bottom of the basin.

I prefer to use the richest ferro-silicon of commerce, it having the least percentage of iron in its composition, and consequently cost ing but little to be reduced to a powdered condition, and requiring the minimum quantity to produce the desired effect.

Practice has shown that by incorporating with suitable molten chill-hardening cast-iron in the basin of the mold during the casting of the wheel, say, four pounds of about eight per cent. finely-powdered ferro-silicon, very beneficial effects are produced upon the iron composing the hub and inner plate parts of the wheel; but ferro-silicon being an artificial product, its quality is not always correctly given. Therefore I do not confine myself to the exact quantity named, but use such quantities as the molten iron may require to produce the best results; nor do I confine myself to any exact period in the pouring to the mold before commencing to incorporate ferro-silicon with the inflowing iron, but I begin at that period in filling the mold which practice shows to be best calculated to effect the most beneficial result upon the character of the wheel being cast.

Care must be taken when incorporating the ferro-silicon with the inflowing iron to have as small a quantity as possible diffused throughout the iron composing the tread of the wheel, thus insuring hardness and durability to the tread.

In the drawing is shown a cross-section of a mold for a single-plated car-wheel. A represents the basin of the mold, and B B show the openings in the bottom of the basin leading into the mold.

Having described my invention, I claim—

The method of casting chill-tread cast-iron car-wheels, which consists in forming the tread portion of the wheels by pouring chill-hardening cast-iron, and forming the remaining portions of the wheels by pouring such iron commingled with ferro-silicon in varying quantities, whereby said substance is suitably imparted to the portions of the wheels requiring it, substantially as set forth.

In testimony whereof I hereunto set my hand and seal.

WILLIAM WILMINGTON. [L. S.]

Witnesses:

ALEXANDER WEBER,

LINCOLN HAYS.